No. 702,014. Patented June 10, 1902.
J. H. LUBBERS.
METHOD OF DRAWING GLASS.
(Application filed Jan. 8, 1901.)
(No Model.) 3 Sheets—Sheet 1.

No. 702,014. Patented June 10, 1902.
J. H. LUBBERS.
METHOD OF DRAWING GLASS.
(Application filed Jan. 8, 1901.)
(No Model.) 3 Sheets—Sheet 2.
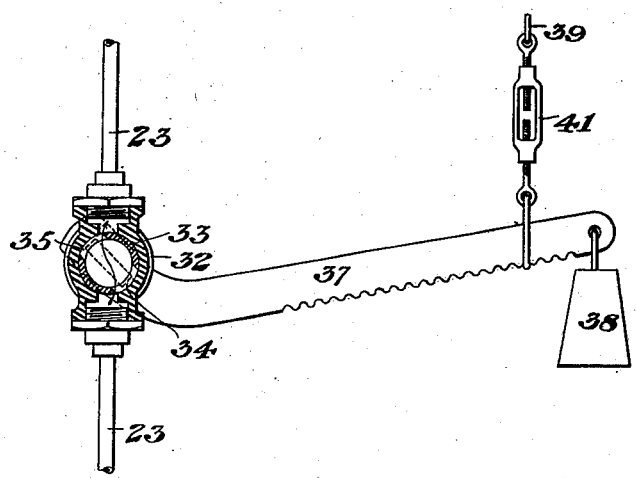
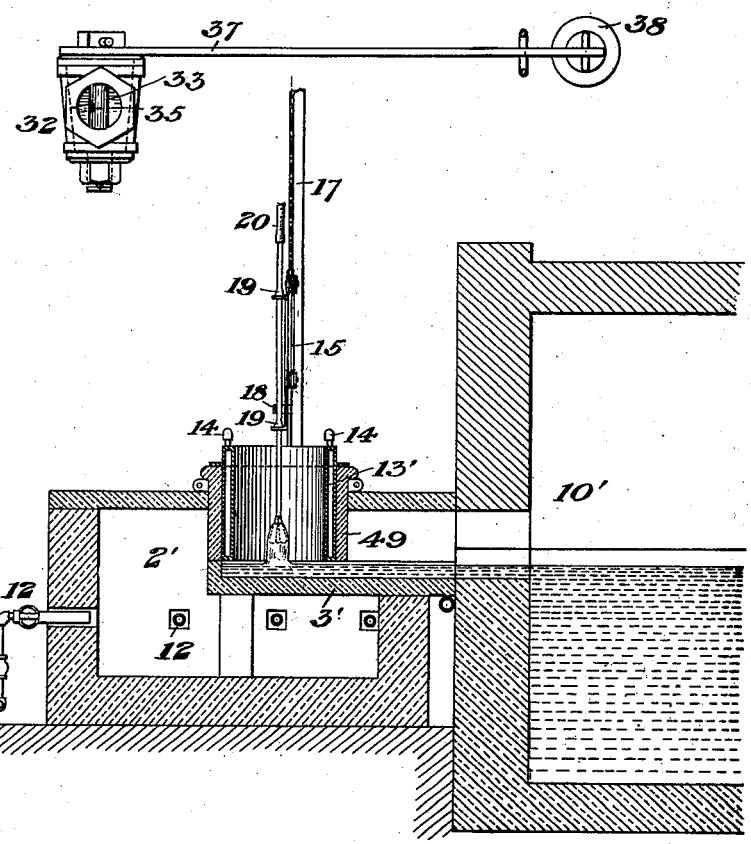
WITNESSES
INVENTOR No. 702,014. Patented June 10, 1902.
J. H. LUBBERS.
METHOD OF DRAWING GLASS.
(Application filed Jan. 8, 1901.)
(No Model.) 3 Sheets—Sheet 3.

WITNESSES

INVENTOR
John H. Lubbers
by Bakewell & Bakewell
his Attorneys.

UNITED STATES PATENT OFFICE.

JOHN H. LUBBERS, OF NEW KENSINGTON, PENNSYLVANIA, ASSIGNOR, BY DIRECT AND MESNE ASSIGNMENTS, TO JAMES A. CHAMBERS, TRUSTEE, OF PITTSBURG, PENNSYLVANIA.

METHOD OF DRAWING GLASS.

SPECIFICATION forming part of Letters Patent No. 702,014, dated June 10, 1902.

Application filed January 8, 1901. Serial No. 42,519. (No model.)

*To all whom it may concern:*

Be it known that I, JOHN H. LUBBERS, of New Kensington, in the county of Westmoreland and State of Pennsylvania, have invented a new and useful Method of Drawing Glass, of which the following is a full, clear, and exact description, reference being had to the accompanying drawings, forming part of this specification, in which—

Figure 1:
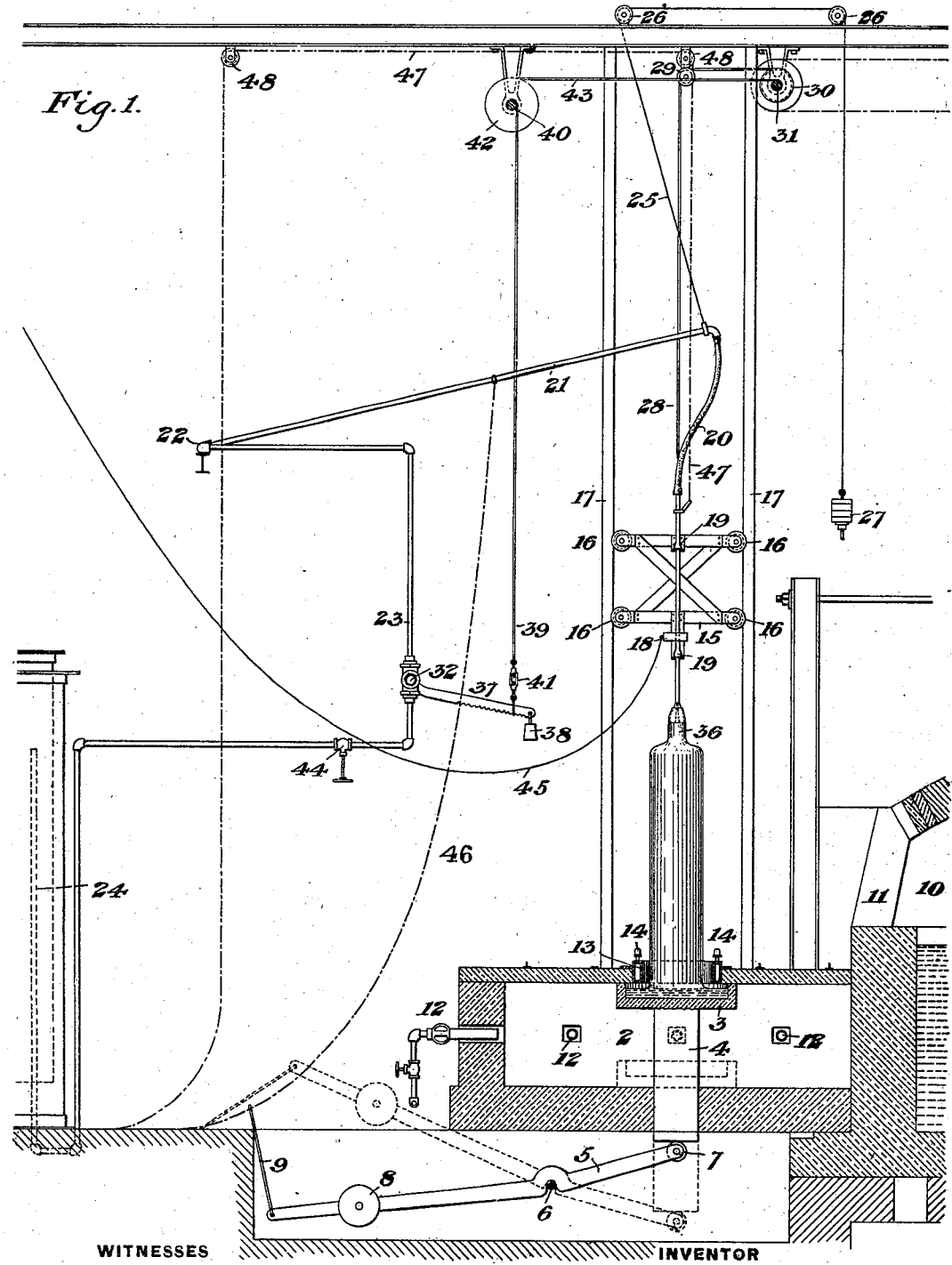
Figure 5:
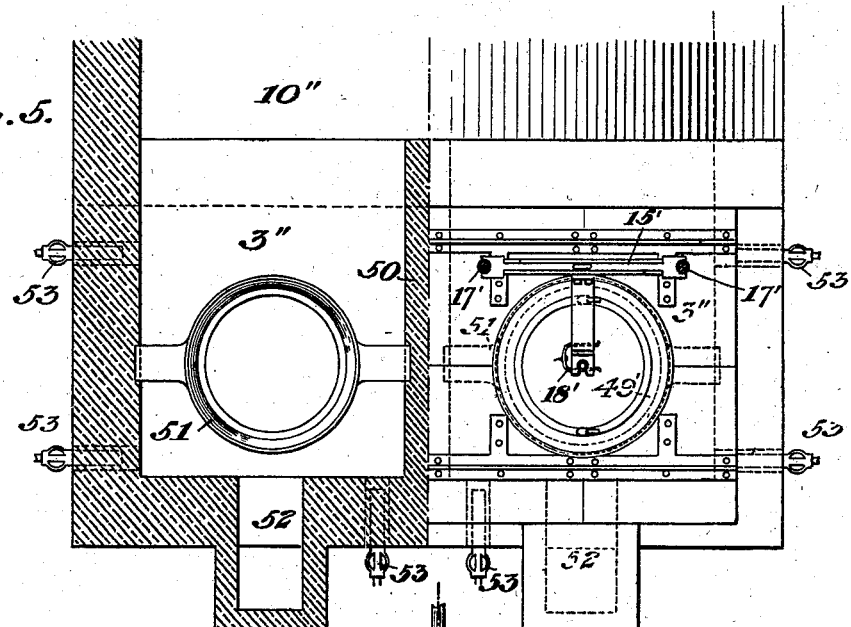
Figure 6:
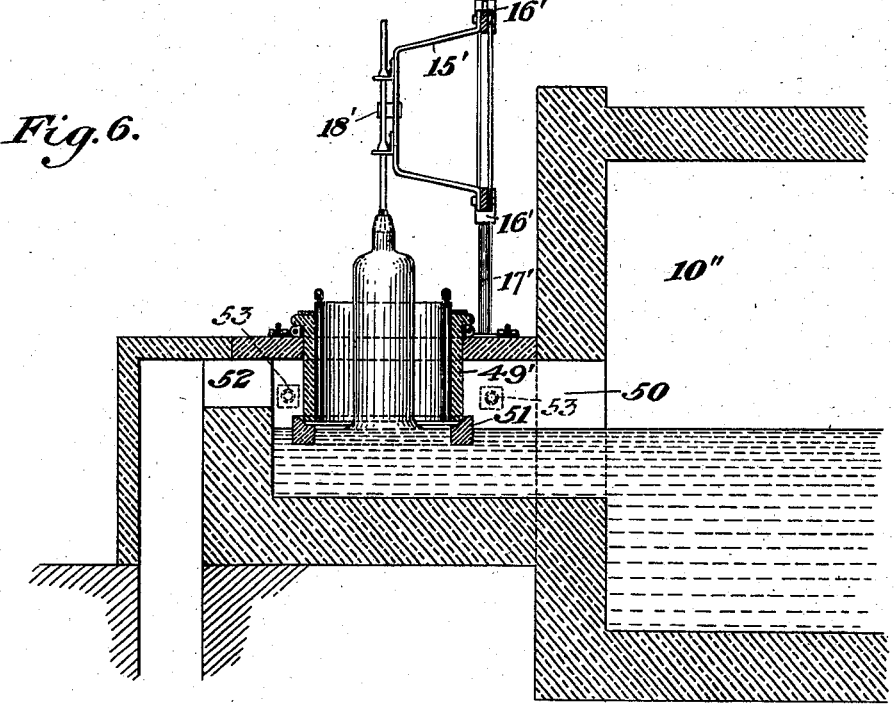

Figure 1 is a side elevation, partly in section, showing apparatus for carrying out my improved process as applied to the formation of rollers or cylinders. Fig. 2 is a partial vertical section showing a modified arrangement of a furnace. Figs. 3 and 4 are enlarged detail views of the valve controlling the air-supply. Fig. 5 is a top plan view, partly in section, showing another arrangement of the furnace extension with two pockets or forehearths side by side; and Fig. 6 is a partial vertical section showing the form of Fig. 5.

My invention relates to the drawing of glass articles from a bath of molten glass, and is designed to provide an improved method therefor by which practical results may be obtained both in the formation of cylinders and as to several of its features in the formation of other glass articles, such as sheets or other shapes which are not hollow.

Referring to the accompanying drawings, which illustrate one form of apparatus for drawing cylinders, I show in Fig. 1 a heating-chamber 2, containing a vertically-movable trough or receptacle 3, of refractory material, carried on a plunger 4. This trough for the glass may be raised and lowered by a suitable lever 5, fulcrumed at 6 and having a roller 7 bearing upon the bottom of the plunger. The lever is provided with a suitable counterweight 8 and an operating link or handle 9, by which the trough may be raised to the position shown in full lines or lowered to that shown in dotted lines in Fig. 1.

The chamber 2 is preferably located adjacent to a glass-tank furnace 10, having an opening 11, through which the glass may be ladled from the furnace into the trough 3, a large ladle being preferably used which will convey enough glass for one roller, and the chamber 2 may be heated by a series of gas-burners 12, projecting thereinto, or by any other suitable means which can be properly regulated to retain the heat at the desired point.

In the top of the chamber 2 is a hole which registers with the trough and in which fits a water-cooled ring 13, having a supporting lateral flange which rests upon the top or roof of the chamber. This ring is provided with suitable inlet and outlet pipes 14, by which a constant circulation of water can be maintained through its hollow interior, and the ring is movable, so that after the drawing operation is completed the trough may be lowered and the ring removed, the top hole then being closed by a suitable cover. The trough may thus be kept heated during the intervals between the drawing operations.

I have shown the drawing apparatus proper as provided with a vertically-moving crosshead or frame 15, having rollers 16, which travel along suitable guideways on the vertical side supports 17. The lower portion of this frame is provided with an adjustable pipe-clamp 18, by which a blowpipe of any usual form may be secured vertically thereto, and I show this pipe as having enlargements 19, resting upon forks projecting from the frame. Air is supplied to the blowpipe through a flexible hose 20 and a swinging pipe 21, pivoted at 22 and receiving an air-supply through pipe 23, extending from within a gasometer 24. A cord 25 is preferably secured to the swinging pipe 21, this cord extending over pulleys 26 and being provided with a counterweight 27.

The cross-head 15 is moved vertically during the drawing operation by a rope 28, secured to it and extending over pulley 29 to a winding-drum 30 on a shaft 31, driven by any suitable connections.

I have found in practice that in order to keep the cylinder of substantially uniform size it is necessary to automatically control the air-supply, so as to regulate it according to the length of the cylinder being drawn, and that the supply of air should be slowly and gradually increased during the drawing operation. To carry out this operation, I provide the supply-pipe 23 with a regulating-cock 32 as shown in Figs. 3 and 4. This cock contains a rotary hollow plug 33, having in its lower portion a large slot 34 and in its upper portion a shorter slot 35, which is preferably of tapered shape, as shown in dotted lines in Fig. 4. This wedge-shaped slot gives a comparatively large air-supply at the beginning of the operation, by which after the neck 36 of the cylinder is formed the glass will be blown out to the desired size of the cylinder, and thereafter as the cock is automatically turned the supply is gradually and slowly increased by the forward movement of the tapered slot. The movement of the valve is preferably effected by a connection with a moving element of the apparatus. Thus I show the projecting stem of the cock-plug as provided with a lever-arm 37, having a counterweight 38 and provided with a cord or rope 39, which extends to and winds upon a shaft 40. The cord is provided with a hook which may be adjusted along the lever to vary the movement as desired, and to adjust the valve to the desired point I provide a turnbuckle 41 in the cord 39. The shaft 40 is provided with a pulley or drum 42, upon which is wound another cord or rope 43, the other end of which is secured to the shaft 31. By this connection as the cylinder is drawn upwardly the lever 37 is gradually lowered by the cord 39, allowing the counterweight to gradually open the valve. The pipe 23 is also provided with a hand-controlled throttle-valve 44, by which the supply of fluid is regulated according to the size of the cylinder, the temperature of the glass, &c. The clamp 18 may be opened when the cylinder is drawn up by a cord 45 within the reach of the operator.

In carrying out my improved process the trough 3 is heated and then lifted into the upper position. The water-cooled ring is then inserted in the opening of the chamber-top, and the requisite amount of glass is ladled from the furnace into the trough. A glass-blower's pipe is then provided with a ball of hot glass, and this ball is marvered so as to thin the bottom portion beneath the bell-shaped mouth of the pipe. This pipe is then secured to the cross-head by the clamp 18, with its bulb portion 19 resting on the forks, and is lowered into the bath of glass in the trough. The shaft 30 then being actuated to lift the cross-head, the neck 36 is first formed by the upward drawing of the glass, and the cock then being automatically turned to give a largely-increased air-supply the glass is swelled out to the size of the desired cylinder or roller. The cross-head then continues its steady and uniform upward movement, and the air-supply is slowly and gradually increased to keep the cylinder of the same size, since any material fluctuation in the volume or pressure of the entering air or gas will of course cause fluctuation in the size of the cylinder. I have found it of the greatest importance that the air-pressure should be uniform, and prefer to use a gasometer such as shown in order to secure this uniformity, though any other apparatus may be used which will give a uniform air-pressure throughout the blowing operation. When the cylinder has been drawn to the desired length, the lifting apparatus may be stopped, preferably by an automatic stop of any desired form, and the lower end of the cylinder is then detached from the glass of the bath. This latter step may be carried out in many different ways; but I prefer to shut off the air-supply and allow the flame or gases to reach the lower end of the cylinder. The step may also be carried out by merely shutting off the air, whereupon the contraction of the air within the cylinder will draw in its lower end and close it, leaving merely a cord connection with the glass of the bath, which can be severed by the attendant. In performing this step it is necessary to allow atmospheric air to enter the blowpipe after the lower end of the cylinder is contracted as desired, since the drawing inwardly and upwardly of the bottom of the cylinder will continue until air is again admitted at the top. The severing in this manner leaves the glass in the trough in good condition for drawing another cylinder, since there is nothing retained in the glass-bath except the small cord connection, which will contact with the ball of glass of the next blowpipe and not injure the cylinder. The glass may, however, be detached in other ways, such as by shears or by admitting the heat to melt the connection. When the lower end of the cylinder is thus detached, the pipe-clamp is then pulled open and the operator draws down on a cord 46, connected to pipe 21, and then releases it suddenly, so that the weight 27 will pull the flexible pipe from the upper end of the blowpipe. The blowpipe and cylinder are then supported by means of a cord 47, secured to the pipe and extending over pulleys 48 and downwardly within reach of the operator. A fork or curved rod is then applied to the cylinder to swing it outward, and by lowering on the rope 47 the cylinder is thus laid horizontally upon a suitable support. The neck 36 or cap is then broken, and the cylinder or roller is ready for the usual operations of cracking and flattening to form the sheet. In the meantime another heated blowpipe, with the ball of glass thereon, is secured to the cross-head, and the operation of blowing the next cylinder is proceeded with. A supply of these blowpipes may be kept heated in any convenient place adjacent to the drawing apparatus. In the form of Fig. 1 the trough is lowered during any substantial intervals between the drawing operations to keep it at the desired temperature.

Instead of using a separate trough or receptacle into which the glass is ladled I may employ a receptacle which is connected with the bath of glass in the tank, so that the trough will be constantly supplied as the glass is drawn from it. Thus in Fig. 2 I show the heating-chamber 2' as provided with a stationary receptacle 3', having an extension connected to the wall of the tank-furnace 10', the hot glass resting at the same level as that in the tank and forming a shallow bath in the receptacle. In this case I preferably use a water-cooled ring 13' of much greater length than in the first form and also preferably use an annular refractory shield 49, which surrounds the water-cooled ring, both of them extending down to or nearly to the level of the glass, so as to shield the glass at the point where the article is drawn from the surrounding heat.

In Figs. 5 and 6 I show another form of the tank extension, the tank 10'' having an extension or forehearth in which the glass rests at the same level as in the tank proper. This may be divided, and in the drawings is shown as divided into two forehearths or receptacles 3'' by a vertical partition or wall 50. In order to overcome the difficulty of completely protecting or shielding the article from heat where it is drawn, I have shown in this form the annular shield 49' as resting upon the inwardly-beveled upper face of a floating refractory ring 51. A joint is thus afforded which cuts off access of the flame to the article being drawn. In this form of my apparatus the glass in the forehearth is heated by the products of combustion, which pass from the main tank over the glass in the extension down through the flue 52 to the stack-flue; but, if desired, the forehearth may be provided with burners to additionally heat the glass, as shown at 53. I believe it is new to draw the glass article from the body of glass contained in a forehearth or extension and subjected therein to heat. In this form of my apparatus I have shown another arrangement of the drawing apparatus, the frame 15' having slides 16', which move upon vertical supports or rods 17'. The vertical supports are suitably braced at intervals in order to form a rigid structure. The pipe-clamp 18' may be of substantially the same form as in the previous figures.

The shielding of the glass at the point of drawing from a surrounding heat is an important part of my invention, since thereby I maintain the proper consistency or condition of the glass at the drawing-point to enable the article to hold its shape, and I have further discovered that the shield must be removed from the side or sides of the article a considerable distance in order to prevent the article from drawing against the shield. This distance must be enough to give clearance and is preferably at least two or three times the thickness of the article being drawn, and, further, the chilling of the glass should be carried out by radiation or convection from a cooling-ring and not by jets of air, as has been proposed hitherto, since the blasts of air will distort the shape of the article.

I find in practice that the article should be completely shielded from the heat of the glass-melting tank at the place where it emerges from the glass. This is especially the case in the formation of hollow articles. This shielding may be accomplished in different ways. Thus, for example, in the form of Fig. 1 the sides of the pot shield the article from the heat when in the raised position. In the form of Fig. 2 the depending shield performs this function, and I use this word in a broad sense to include any cutting off or preventing access of the heat to the article.

In either form or in any form of the apparatus for carrying out my method a number of the troughs with drawing apparatus for each are preferably located around the tank-furnace, so that one workman may attend to the drawing of several cylinders at the same time.

The advantages of my invention are apparent, since the use of a most expensive and skilful grade of hand labor is done away with and glass rollers or other glass articles produced automatically and mechanically. The forming of the neck at the end of the roller facilitates the severing of the roller from the pipe and simplifies the apparatus. The shielding from the surrounding heat and in such a way that the shields do not touch the article is important, especially in the forehearth form of Figs. 2, 5, and 6. The automatic control and regulation of the air-supply contributes to the effectiveness of the method and apparatus, since fluctuations are thereby avoided, which would cause waves or corrugations in the cylinder. The gradual increasing of the air-supply as the cylinder increases in length is necessary to keep it of substantially uniform size. The heating of the lower portion of the bath from which the article is being drawn is important, since by heating this lower portion and chilling the glass adjacent to the point of drawing I can control the drawing action and keep it uniform.

In so far as the methods herein described and claimed are applicable in drawing other forms of glass than cylinders or hollow articles the same are included herein. Other fluids than air may be used for expanding the cylinder, and many changes may be made in the apparatus without departing from my invention.

I claim—

1. The method of forming glass cylinders, consisting in drawing a cylinder from a bath of molten glass, heating that portion of the body of glass from which the cylinder is drawn, shielding the cylinder from the heat, and supplying air to the interior of the cylinder during the drawing operation; substantially as described.

2. The method of forming glass cylinders, consisting in drawing a cylinder from a bath of molten glass, heating that portion of the body of glass from which the cylinder is drawn, preventing access of the heat to the exterior of the cylinder, chilling the cylinder by radiation adjacent to the drawing-point, and supplying air to the interior of the cylinder during the drawing operation; substantially as described.

3. The method of forming hollow glass articles, consisting in drawing a hollow article from a bath of molten glass, chilling the article by radiation around its entire circumference adjacent to the drawing-point, and supplying air to the interior of the article during the drawing operation; substantially as described.

4. The method of forming hollow glass articles, consisting in drawing a hollow article from a bath of molten glass, preventing access of heat to the exterior of the article, chilling the exterior of the article by radiation around its entire circumference adjacent to the drawing-point, and supplying air to the interior of the article during the drawing operation; substantially as described.

5. The method of forming hollow glass articles, consisting in drawing a hollow article from a bath of molten glass, supplying air to the interior of the article, and increasing the rate of air-supply as the article increases in length; substantially as described.

6. The method of forming hollow glass articles, consisting in drawing a hollow article from a bath of molten glass, supplying air to the interior of the article as it is formed, and automatically regulating the rate of the air-supply as the article increases in length; substantially as described.

7. The method of forming hollow glass cylinders, consisting in lowering a bait into a bath of molten glass, drawing a hollow neck portion, increasing the air-supply, and enlarging the diameter to substantially the diameter of the desired cylinder, and then continuing the drawing operation and supplying air to maintain the cylinder at the desired diameter; substantially as described.

8. The method of forming hollow glass articles, consisting of lowering a hollow bait into a bath of molten glass, drawing a hollow article from the bath, supplying a gaseous fluid to the interior of the article during drawing, severing the lower end of the article from the bath, moving the drawing device with the hollow bait and article suspended therefrom to one side of the bath, lowering the article into horizontal position while attached to the drawing device, and then severing the article from the bait, substantially as described.

9. The method of forming hollow glass cylinders, consisting in lowering into a bath of molten glass a bait of small diameter relatively to the desired cylinder, drawing a glass neck, increasing the air-supply, and expanding the diameter to the desired size, drawing the cylinder, detaching the lower end of the cylinder from the bath, moving the bait with the cylinder suspended therefrom to one side, and severing the reduced neck portion; substantially as described.

10. The method of forming hollow glass articles, consisting in drawing a hollow article from a bath of molten glass, creating a partial vacuum therein to reduce the diameter at the lower end of the article, admitting heat-currents to this reduced portion, and removing the article; substantially as described.

11. The method of forming glass articles, consisting in drawing a glass article from a bath of molten glass, heating that portion of the body of glass from which the article is drawn, shielding the article adjacent to the drawing-point from the heat, and chilling the article by radiation adjacent to the drawing-point during its formation; substantially as described.

12. The method of forming hollow glass articles, consisting in drawing a hollow article from a bath of molten glass, severing the lower end of the article from the bath by admitting heat-currents to the lower portion and then moving the article to one side and severing its upper end from the drawing device, substantially as described.

13. The method of forming glass articles, consisting in drawing a glass article from a bath of molten glass, heating that portion of the body of glass from which the article is drawn, and chilling the exterior surface of the article by radiation adjacent to the drawing-point during its formation; substantially as described.

In testimony whereof I have hereunto set my hand.

JOHN H. LUBBERS.

Witnesses:
H. M. CORWIN,
L. M. REDMAN.